United States Patent [19]
Vernooy et al.

[11] 3,862,497
[45] Jan. 28, 1975

[54] PIPELINE PIG
[75] Inventors: Burton Vernooy; Robert L. Kendall, both of Tulsa, Okla.
[73] Assignee: T. D. Williamson, Inc., Tulsa, Okla.
[22] Filed: July 25, 1973
[21] Appl. No.: 382,306

[52] U.S. Cl.......... 33/141 G, 33/141.5, 235/92 DN, 324/171
[51] Int. Cl........................... G01b 3/12, G01b 7/04
[58] Field of Search ....... 33/141 G, 141.5; 324/171; 235/92 FQ, 92 DN

[56] References Cited
UNITED STATES PATENTS
| | | | |
|---|---|---|---|
| 3,134,175 | 5/1964 | Potts | 33/141 G |
| 3,195,236 | 7/1965 | Green et al. | 33/141 G |
| 3,500,190 | 3/1970 | Michon | 324/161 |
| 3,732,625 | 5/1973 | Vernooy | 33/141.5 |

Primary Examiner—Samuel B. Rothberg
Assistant Examiner—Steven L. Stephan

[57] ABSTRACT

A pipeline pig is provided with at least two wheels mounted thereon to roll along the inner wall of the pipeline. Pulses are generated as each wheel turns a predetermined revolution such as by a magnet carried by each of the wheels for movement past a magnetic flux responsive switch carried by the mechanism mounting the wheels. Thus, as each wheel revolves, its respective magnet moves past the switch to actuate it and thereby provide a pulse responsive to the distance moved by the pig. Each of the flux responsive switches is connected to a circuit means for providing an output responsive to the largest count obtained from the individual flux responsive switches over an increment of travel of the pig.

10 Claims, 2 Drawing Figures

PATENTED JAN 28 1975

3,862,497

PIPELINE PIG

This invention relates to a pipeline pig having a plurality of wheels each with an arrangement mounted thereon in such a way that the distance traversed by the pig can be determined, and in one of its aspects, permitting the pig's position at any given time to be correlated with other data gathered by an instrument also carried by the pig whereby the occurrence of events generating such data can be located along the pipeline. This invention is an improvement over that described in U.S. Pat. No. 3,732,625, entitled "Pipeline Pig," issued May 15, 1973, and owned by the assignee of this invention.

Instrumented pipeline pigs are used for numerous purposes such as surveys of the pipeline for pressure variations, out-of-roundness, internal corrosion, leaks, etc. In the past, devices of a variety of designs have been suggested to provide an accurate means for indicating the position of such a pig at a particular time while it is passing through a pipeline so that, for example, there can be a correlation of the distance traveled by the pig with the readings gathered by an instrument in the pig. In this manner, the location of each event detected by the instrument can be located along the pipeline length with a desired degree of accuracy.

One suggested prior art device for accomplishing this involves the use of a pipe joint counter. The distance traveled by the pig using these joint counters was to be computed by multiplying the number of the pipe joints counted times the length of a standard joint. These devices were inaccurate because various lengths of pipe are used and some pipe joints, especially in internally plastic coated lines, are so smooth as to not cause the device to count a joint, thereby causing error in the computation of distance.

Another device involved the use of individual radiation sources located at measured intervals along the pipeline and a radiation detector (e.g., Geiger counter) mounted in the pig passed down the line along with making a record of such detections. This was unfeasible not only because of the danger, real or imagined, of handling the radiation sources, but also because of the mechanical problems of locating them along the length of the buried pipeline. Thus, the sources had to be located close to the pipe which involved either digging holes along the pipe or driving stakes with the sources at the driven ends. Either approach is cumbersome and expensive.

Another suggested design involved metering the flow of fluid through the pipeline and plotting the pig's location based on the rate of flow. However, this presupposes that there will be no leakage past the pig and, in gas lines, that the pig's rate of travel is uniform at all times.

A number of prior art devices have been suggested for measuring the distance traversed by a machine by use of a rolling odometer wheel mechanically or electrically connected to a counter, such as shown in Product Engineering, July 31, 1961, at page 37; and in U.S. Pat. Nos. 2,292,938; 3,134,175; 3,508,433; 3,195,236; and 2,834,113. Also, in prior U.S. Pat. No. 3,732,625 referred to, an odometer wheel and magnetic sensing apparatus is utilized in a pipeline pig to step an odometer and to advance a chart recorder without mechanical linkage so that the distance traversed by the pig and the location of a point in the pipeline can be determined.

While the pig described in that application provides desirable features not found in the prior art referenced, it, like all of the other referenced patents except U.S. Pat. No. 3,134,175 illustrates only one odometer wheel. Because of this, there are occasions where the odometer reading may be less than a desired accuracy due to slippage of the odometer wheel, particularly where it runs in mud or grease on the bottom of the pipeline. In U.S. Pat. No. 3,134,175, a plurality of odometer wheels is used at different circumferential positions about a pipe which would tend to alleviate the problem due to slippage of only one wheel, however, this device requires relatively complicated mechanical linkage between sets of wheels and three separate odometers. The requirement for the type of mechanical linkage shown and the general arrangement shown would make the apparatus shown in U.S. Pat. No. 3,134,175 an impractical design for use in a pipeline pig of standard configuration, such as shown in U.S. Pat. No. 3,732,625. Also, the use of a mechanical linkage to directly drive an odometer or recorder from the odometer wheel loads the odometer wheel so that it is more likely to slip and miss a count, and requires more traction.

The primary object of this invention is to provide a pipeline pig which can accurately indicate the distance traversed by the pig along the pipeline in the manner of the pig shown in U.S. Pat. No. 3,732,625, but with substantially less chance of error due to slippage of an odometer wheel.

Another object of this invention is to provide such a pipeline pig which measures distance while traversing the pipeline by the use of a plurality of wheels carried by the pig wherein the revolutions of the wheel having the largest number of revolutions (of parts thereof) over an increment of travel of the pig, are indicated.

Another object of this invention is to provide such a pig wherein the revolutions of the wheels are indicated in such a manner that the wheels are not loaded, that is, they do not have to generate any significant force to drive a counter, recorder, or the like through a mechanical linkage.

Another object is to provide a pig with a distance indicating device that does not require any prepreparation of the pipeline and which gives reliably accurate results even in plastic coated lines having a very smooth interior.

Other objects, advantages, and features of the invention will be apparent to one skilled in the art upon consideration of the specification, the claims, and the appended drawings, wherein:

Figure 1:
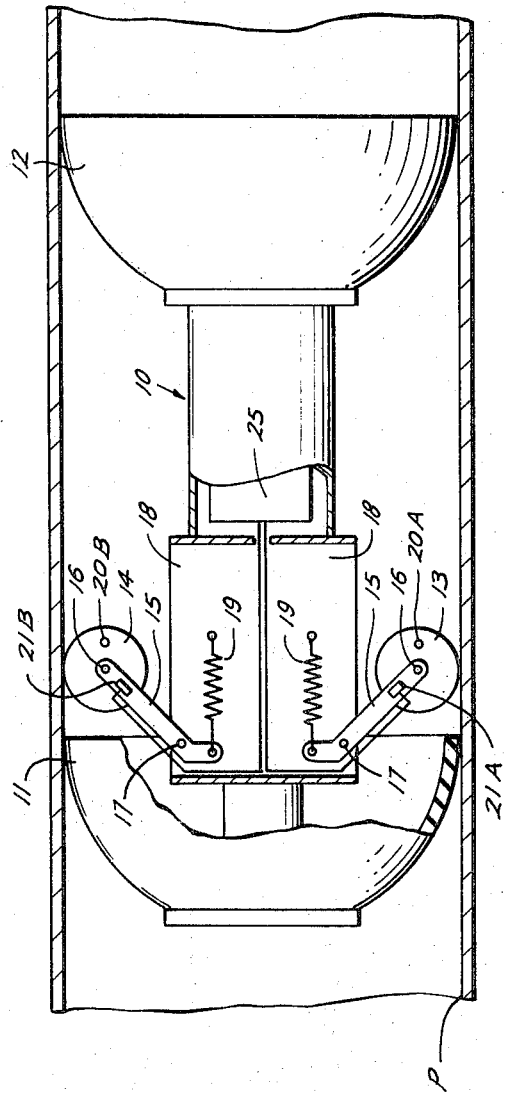
FIG. 1 is a general elevation of a view of a preferred embodiment of the pig made in accordance with this invention showing the pig within a pipeline.

Referring to FIG. 1, the pig of this invention is shown as including a central body portion 10 and means for impeding flow of pipeline fluid past the pig while preferrably supporting it so that the pig will be propelled by such fluid along the pipeline. Such means is here shown as sealing cups 11 and 12 shaped as hollow hemispheres and adapted to sealingly engage the inner wall of pipeline P. Alternatively, the body could be enlarged to obstruct the major portion of the flow and not require sealing cups. The pig body 10 can be hollow to receive various instrumentation packages as well as recording means as hereinafter described.

The pig is provided with a plurality of wheels, whose functions are to roll without significant slippage along the inner wall of the pipeline as the pig is propelled through the line. It is preferred that these wheels be located about the pig body so that they are disposed at different circumferential positions about the pipeline when the pig is installed therein. In the embodiment illustrated in FIG. 1 two such wheels 13 and 14 are shown, each having the same circumference. By counting the number of revolutions of the wheels, 13 and 14, an accurate measurement of the distance the pig has traveled from one point to another can be determined thereby permitting a determination of the pig's location at any particular time. Of course, this presupposes that the wheels do not skid or slip along the pipeline wall and that for each revolution of the wheels, the pig will have moved down the pipeline a distance equal to the circumference of the wheel.

Means are provided mounting the wheels on the pig body for free rotation with respect to the pig body, so that at least one of the wheels rollingly engages the inner wall of the pipeline at all times (except, in the unusual case where each wheel passes a side opening at the same time). However, it may be preferred in some cases that the mounting means also resiliently bias the wheel outwardly of the pig body for rolling engagement with the inner wall of the pipeline as the pig moves therealong. As illustrated in the drawings, this means includes a pair of parallel arms 15 (only one such arm for each wheel being shown in FIG. 1) presenting for each of wheels 13 and 14 a bifurcated outer end in which the wheel is mounted. Such mounting may be by a suitable bolt 16 passing through the wheel. A suitable low friction bearing (not shown) should be disposed between each of the wheels and its axle furnished by bolt 16 so that the wheel can rotate quite freely on its axle with a minimum of rotative frictional resistance.

In the embodiment illustrated, arms 15 are pivotally connected to the pig body at positions 180° apart so that wheels 13 and 14 will swing in a circular arc toward and away from the wall of pipeline P. Thus, a bolt 17 can pass through side plates 18 on pig body 10 and a suitable opening in arms 15 to pivotally mount the latter on the pig's body. Suitable mounting details for each of wheels 13 and 14 are illustrated in U.S. Pat. No. 3,732,625, the disclosure of which is incorporated by reference, however, these details can take many different forms.

The resilient bias for arms 15 can be provided by springs 19 having one of its ends fastened to the pig body and the other end to the inner end of arms 15.

It is preferred that the diameter of the wheels and the arrangement of the mounting means be such that when one of the wheels is biased into a side opening in the pipeline, only the wheel engages the terminus of the side opening (e.g., the wall of a side outlet pipe). This permits the wheel to move or roll out of the side opening without the mounting means engaging or striking against anything. Preferably, stop means, such as cup 11, are provided to limit outward movement of the wheels so that when one of the wheels is in its outermost position, as in a side opening, its axis is radially inward of the inner wall of the pipeline.

A magnetic flux means is mounted on each of the wheels to move past a portion of the wheel mounting means for each revolution of the wheel. Preferably this magnetic flux means comprises small permanent magnets 20A and 20B attached respectively to one side face of each of wheels 13 and 14. A magnetic flux responsive means is situated on each of the mounting means so that the magnets on the wheels will move therepast for each revolution of the wheel. Such flux responsive means are preferably magnetic switches 21A and 21B of the reed type which may include spring contacts arranged in a normally open position. However, when the magnet exerts its flux field on the switch, one of the contacts will move into contact with the other thereby closing the circuit. Each of switches 21A and 21B form part of the circuit shown in FIG. 2.

Figure 2:
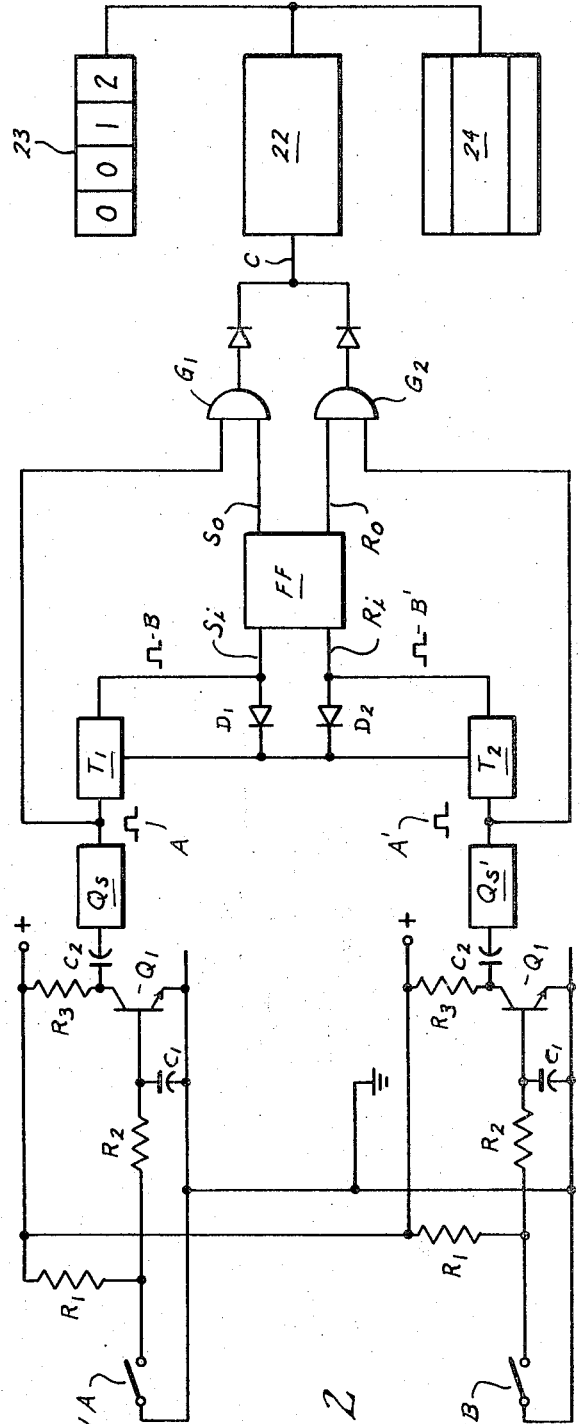
FIG. 2 is a circuit diagram illustrating the preferred form of circuitry for reading out and recording the instantaneous position of the pig.

Referring now to FIG. 2, each of switches 21A and 21B which are single pole, single throw switches, is connected as part of one of two identical input circuits. Thus, the following description of the operation of the circuitry associated with switch 21A applies to each such circuitry. The input circuitry associated with switch 21A includes a resistor $R_1$ through which voltage from a voltage source (not shown) is supplied to one contact of switch 21A, which has its other contact grounded. Resistor $R_1$ is also connected to conduct the supply voltage to a low pass filter comprising a resistor $R_2$ and a capacitor $C_1$ and the filter functions to eliminate or reduce switch contact bounce and input noise which may cause an erroneous indication of a wheel revolution. One side of capacitor $C_1$ is grounded and resistor $R_2$ is connected between resistor $R_1$ and capacitor $C_1$, and the junction of $R_2$ and $C_1$ is connected to the base of a grounded emitter NPN transistor $Q_1$. The collector of transistor $Q_1$ is connected through resistor $R_3$ to the voltage source. Thus, when switch 21A is open, the base voltage of transistor $Q_1$ builds up to the charge level of capacitor $C_1$, and transistor $Q_1$ conducts. However, when switch 21A closes, discharging capacitor $C_1$ through resistor $R_2$, transistor $Q_1$ ceases to conduct, raising the collector voltage to provide a voltage pulse the duration of which is dependent on the length of closure of the switch 21A and the time constant of $R_1$, $R_2$ and $C_1$. Thus, as each of the wheels 13 and 14 roll along the pipeline a pulse train is provided at the collector of each of transistors $Q_1$ with the number of pulses in each train over an increment of travel being responsive to the distance the respective wheel has traveled during that increment.

The pulse trains from each of transistors $Q_1$ are then differentiated by a capacitor $C_2$ and then applied to the inputs of identical monostable multivibrators Qs and Qs' which produce relatively narrow pulses A and A' respectively for each passing of the respective magnet 20A or 20B past the appropriate reed switch 21A or 21B. The circuitry described in combination with magnets 20A and 20B and switches 21A and 21B thus functions as a preferred form of pulse generating means for providing pulses A or A' when one of wheels 13 or 14 turns a predetermined revolution, i.e., in the embodiment illustrated, one revolution, so that a series of pulses A or A' provide separate pulse trains each having a pulse repetition rate related to the rate of revolution of the wheel associated therewith.

In accordance with this invention comparison means is provided for comparing the pulse repetition rates of the respective pulse trains comprising pulses A or A' and providing an output signal normally responsive to the pulse train having the highest pulse repetition rate over an increment of travel of the pig. In this manner the output signal has some property, such as frequency or amplitude, related to the pulse repetition rate of the pulse train to which it is responsive. As illustrated in FIG. 2, a preferred form of this comparison means is illustrated as a circuit means in which the repetition rate of the output signal is related to the repetition rate of the pulse train having the highest repetition rate over a predetermined pulse count period representing a predetermined increment of travel of the pig. For this purpose pulses A and A' are respectively conducted to the input of identical totalizer circuits or counters $T_1$ and $T_2$ which accumulate pulses A and A' respectively until some identical, preset count of pulses arrive, for example, five, at which time output signals B and B' are produced respectively by counters $T_1$ and $T_2$. The circuit means also includes diodes $D_1$ and $D_2$ and the outputs of each of counters $T_1$ and $T_2$ are respectively connected through diodes $D_1$ and $D_2$ to the reset inputs of both counters so that whichever counter is filled first, and produces its output B or B', will reset both totalizer circuits. In the preferred embodiment illustrated the circuit means also includes a bi-stable circuit, such as a flip-flop circuit FF having a set input $S_i$, a reset input $R_i$, a set output $S_o$, and a reset output $R_o$, and further includes two AND gate circuits $G_1$ and $G_2$. The output of counter $T_1$ is connected to set input $S_i$ of flip-flop circuit FF, and the output of counter $T_2$ is connected to reset input $R_i$ of flip-flop FF. Thus, if signal B is generated first (counter $T_1$ being filled first) it will "set" flip-flop FF, but if signal B' is generated first (counter $T_2$ being filled first) it will "reset" flip-flop FF. Set output $S_o$ of flip-flop FF is connected to one input of AND gate $G_1$ which has its other input connected to the output of multivibrator Qs for receipt of pulses A, and reset output $R_o$ of flip-flop FF is connected to one input of AND gate circuit $G_2$ which has its other input connected to the output of multivibrator Qs' for receipt of pulses A'. The respective outputs of the flip-flop function as pulse selection signals for selecting the pulse train having the highest rate over each of successive count periods. Thus, when signal B is provided, output $S_o$ is high so that pulses A are selected to be gated through gate $G_1$ to provide an output signal C which functions as the output signal of the circuit means described. However, when signal B' is present, output $R_o$ is high and pulses A' are selected to be gated through gate $G_2$ to provide output signal C. As noted, in the embodiment described the repetition rate of output signal C is that of either pulses A or A', depending on which pulses are gated through their respective gates. Thus, signal C can be counted or accumulated to provide an indication of the distance traveled by the pig.

For this purpose, output signals C may be applied to the input of instrument drive circuitry 22 which shapes and amplifies the pulses C for stepping indicating apparatus such as an odometer 23, or the Y axis of a digital chart recorder 24 or both. The output pulses C can be used to advance the recording medium, such as paper or film in a chart recorder and it may do so at one step per pulse so that should the pig hangup in the pipeline, the output pulses would cease and the recording medium would not be unnecessarily wasted as it would be if it were driven by a constant speed device. Of course, signals C could be utilized to drive other apparatus which require a signal responsive to the position of a pig in a pipeline.

The electronics and indicating apparatus described may be mounted in a pig body 10 such as at 25 in FIG. 1. Each of the circuits described are conventional and can be readily provided by persons skilled in the art.

With the foregoing arrangement, it will be seen that as the pig is propelled along the pipeline, wheels 13 and 14 will revolve to move magnets 20A and 20B past switches 21A and 21B once each revolution of the wheel. This provides a series of output pulses which are proportional in number to the distance moved by the pig. This arrangement results in what can be termed as essentially "no load" condition for the wheel in that it need not generate any significant force for driving a counting arrangement and therefore can roll along the pipeline without any tendency to slip therealong as might be the case if a substantial torsional load was imposed on the wheel. Also, the magnet-switch arrangement is one which is not susceptible of malfunction due to exposure to dirty fluids, debris, etc., as occur in many pipelines. Of course, more than one magnet may be used per wheel so that the predetermined revolution counted is 1/2, 1/3, etc. Further, since two or more wheels are used, and the wheel providing the most count over a given time period is the one that is effective, because of the use of the circuitry described, if one of the wheels slips or skids more than the other wheel, the revolutions of the other wheel will cause signal C to be provided and indicated. With the arrangement of FIG. 2 assume that wheel 13 and pulses A therefrom initially provide signal C since gate $G_1$ is gated by the set output of flip-flop FF. However, should wheel 13 slip enough to provide less pulses during one count period (the period from the first pulse after reset to the next reset, for example, 0–5 counts in the example given) than wheel 14, then during succeeding count periods, pulses A' will provide signal C until wheel 14 slips or skids sufficiently to provide less pulses than wheel 13 during a count period. Thus, the repetition rate of signals C will normally be that of the pulses from the wheel that slips or skids least during any increment of travel of the pig, although there may be relatively short periods immediately prior to such a transition when such is not true.

From the foregoing, it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the apparatus of this invention without departing from the scope thereof, it is to be understood that all matter herein set forth or shown in the accompanying drawings is to be interpreted as illustrative and not in a limiting sense.

The invention having been described, what is claimed is:

1. A pipeline pig for indicating the distance from one point to another point or points in a pipeline comprising, in combination: a pig having a central body and means carried by the body for impeding flow of pipeline fluid past the pig so that the pig is propelled by such fluid along the pipeline; a plurality of wheels;

means for mounting each of said wheels on said body; a plurality of pulse generating means each including a magnetic flux means carried by each of said wheels for rotative movement past a portion of one of said mounting means and pig body and means situated at each of such portions to produce a discrete pulse only when the respective one of said flux means moves therepast to provide a plurality of pulse trains each having a pulse repetition rate related to the rate of revolution of the wheel associated therewith; and comparison means for comparing the pulse repetition rates of the respective pulse trains and providing an output signal normally responsive to the pulse train having the highest pulse repetition rate over an increment of travel of the pig, said output signal having a property related to the pulse repetition rate of such pulse train.

2. The pig of claim 1 wherein said comparison means includes circuit means for so comparing the repetition rates of said pulse trains over predetermined, successive count periods each including a plurality of pulses to provide at least one pulse selection signal in response to the pulse train having the higher repetition rate during said count period, and gate means responsive to said pulse selection signal to provide said output signal in response to the last mentioned pulse train substantially until a change in said pulse selection signal indicates that another of said pulse trains has the higher repetition rate during a succeeding count period.

3. The pig of claim 2 wherein said circuit means includes a plurality of counters each connected to one of said pulse generating means for counting a predetermined number of pulses therefrom, and a bi-stable circuit connected to be responsive to each of said counters to provide said pulse selection signal in response to one of said counters counting said predetermined number of pulses, and wherein said gate means includes a plurality of gate circuits each connected to said bi-stable circuit to be responsive to said pulse selection signal, each of said gate circuits also being connected to one of said pulse generating means to be responsive to the pulses therefrom.

4. The pig of claim 3 including two of said wheels mounted thereon each having one of said pulse generating means associated with it so that two of such pulse trains are provided, and including two counters each for counting a predetermined number of pulses in one of said pulse trains, and wherein said bi-stable circuit is a flip-flop including two inputs with each of said inputs being connected to one of said counters, to provide two distinctive pulse selection signals, and including two gate circuits each connected to said flip-flop to be responsive to one of said pulse selection signals.

5. The pig of claim 1 wherein each of said magnetic flux means is a permanent magnet.

6. The pig of claim 1 wherein each of said magnetic flux responsive means is a switch having contacts which open and close responsive to the magnetic flux means on the wheel passing by the switch.

7. The pig of claim 6 wherein each of said magnetic flux means is a permanent magnet.

8. The pig of claim 1 wherein said plurality of wheels are mounted by said mounting means on said pig body so as to be disposed at different circumferential positions about said pipeline when said pig is in said pipeline.

9. The pig of claim 8 wherein said mounting means are located at positions on said pig body approximately 180° apart.

10. The pig of claim 1 further including indicator means connected to be responsive to said output signal to provide a readout proportional to the distance traversed by said pig.

* * * * *